United States Patent Office 2,984,336
Patented May 16, 1961

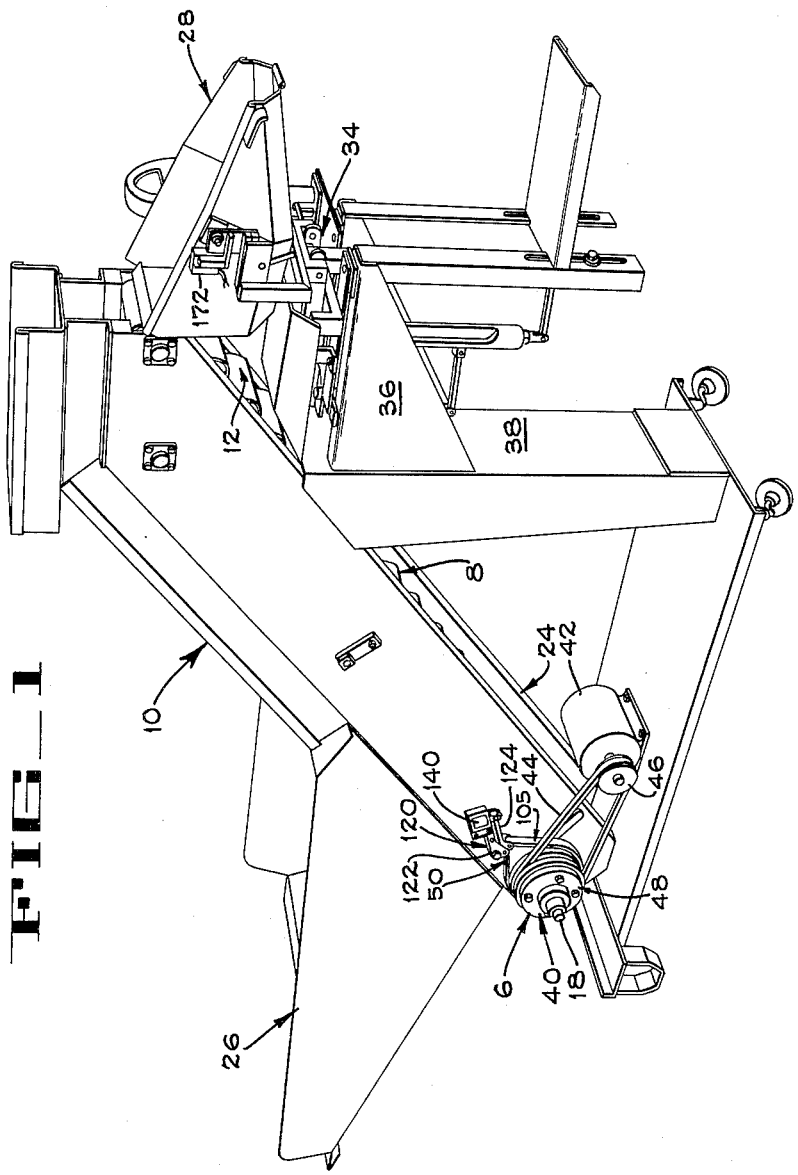

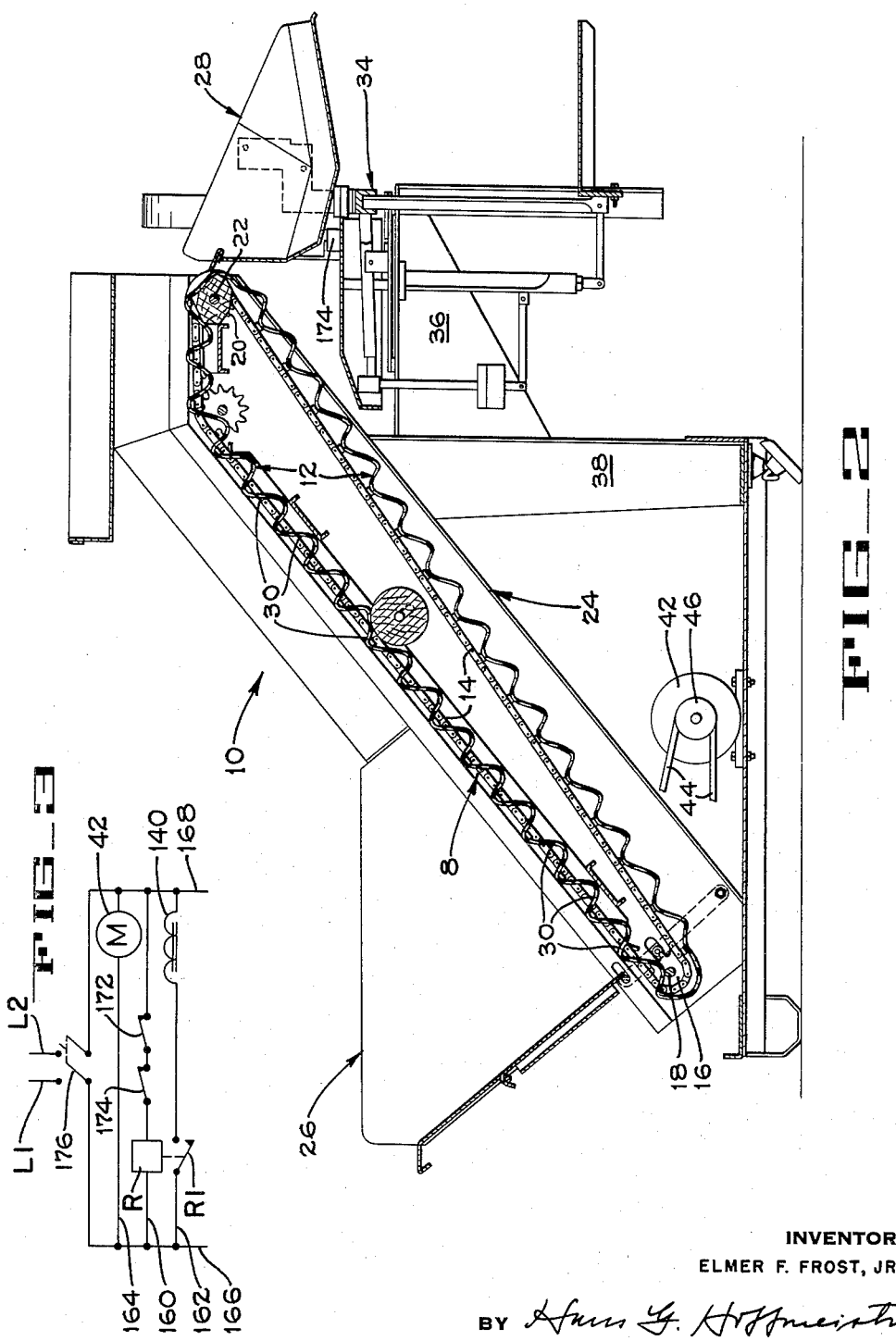

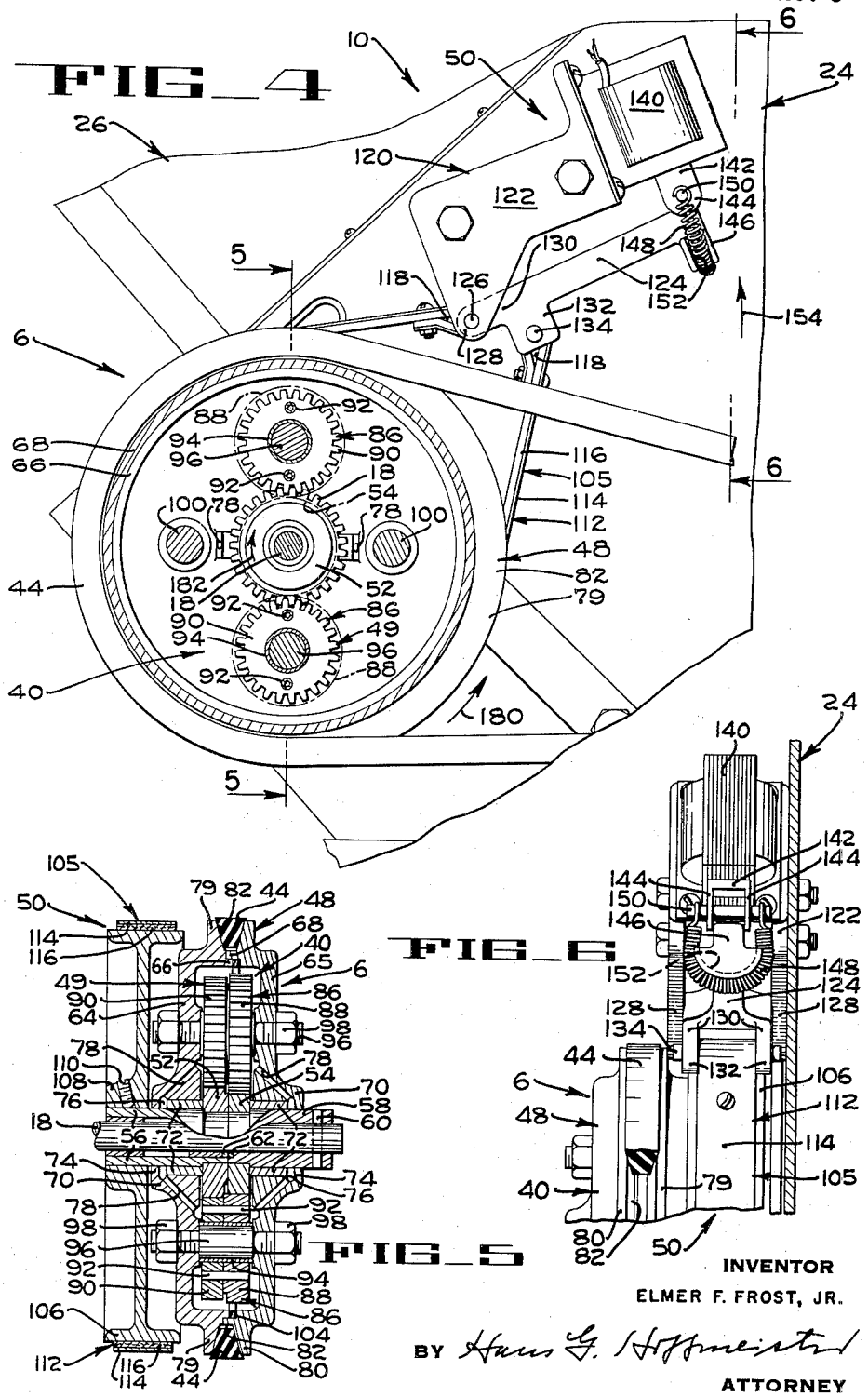

2,984,336

CONVEYOR DRIVE MECHANISM

Elmer F. Frost, Jr., Lakeland, Fla., assignor to Food Machinery and Chemical Corporation, San Jose, Calif., a corporation of Delaware Filed Nov. 27, 1957, Ser. No. 699,302

6 Claims. (Cl. 198—203)

The present invention appertains generally to weighing and bagging machines and more particularly to a drive mechanism for conveyors in machines of the type mentioned.

It is an object of the present invention to provide an improved conveyor drive mechanism for a weighing and bagging machine.

Another object is to provide novel means for smoothly starting and stopping the conveyor of a weighing and bagging machine.

Another object is to provide self-adjusting means in the conveyor drive mechanism to compensate for wear.

Another object is to provide a novel conveyor drive mechanism for a weighing and bagging machine that is capable of continuous, dependable and trouble free operation for long periods of time.

These and other objects and advantages of the present invention as well as the manner in which the invention is employed will become apparent from the following description and the accompanying drawings, in which:

Fig. 1 is a perspective of a weighing and bagging machine employing the conveyor drive mechanism of the present invention.

Fig. 2 is a vertical medial section taken longitudinally of the machine of Fig. 1.

Fig. 3 is a diagram of the electrical control system of the machine shown in Figs. 1 and 2.

Fig. 4 is an enlarged fragmentary side elevation of the present weighing and bagging machine with a portion of the conveyor drive mechanism broken away to disclose internal structure.

Fig. 5 is a section along the lines 5—5 of Fig. 4.

Fig. 6 is a fragmentary section along the lines 6—6 of Fig. 4.

As illustrated in the drawings, the drive mechanism 6 (Figs. 1, 4 and 5) of the invention is operatively associated with the elevating conveyor 8 of a machine 10 for weighing and bagging potatoes, apples, or produce of a similar nature. The conveyor 8 comprises an endless belt 12 (Fig. 2) attached at spaced intervals along its lateral edges to carrier chains 14 (only one of which is shown) trained around lower sprockets 16 secured to a drive shaft 18 and around upper idler sprockets 20 carried by a shaft 22. The shafts 18 and 22 are suitably journalled adjacent the lower and upper ends, respectively, of an inclined conveyor frame 24 carrying a receiving bin or hopper 26 adapted to receive the bulk produce to be bagged, and to feed the material to the belt 12 in a manner permitting the latter to successively convey small quantities of the produce upwardly from beneath the receiving hopper 26 to a weighing hopper 28 that is mounted in a suitable, elevated location. With this manner of operation in view, the belt 12 is so arranged with relation to its supporting and driving chains 14 that it is retained in a wavy, or sinuous form so as to present an endless series of transversely extending pockets 30 that open upward to the open bottom of the receiving hopper 26 as they pass thereunder. Thus, each pocket 30 is adapted to receive a quantity of the produce to be weighed and bagged, and to deliver the same to the weighing hopper 28. The weighing hopper 28 is pivotally mounted so as to be easily emptied, and is carried by a weighing mechanism 34, which may be of any common type, that is supported by a mounting bracket 36 on a leg 38 supporting the upper end of the conveyor frame 24. The weighing mechanism 34 is effective to resiliently support the weighing hopper 28 in raised position (Fig. 1) when it is empty of articles and to permit the hopper 28 to move to a lower position when a quantity of produce, having the weight for which the weighing mechanism 34 is set, is received within the hopper 28. The weighing mechanism 34 preferably is adjustable to permit variation of the weight required to be imposed upon the hopper 28 before the latter moves to the lower position.

It is the function of the drive mechanism 6 of the invention to drive the conveyor 8 of the weighing and bagging machine 10 until the desired quantity of produce is delivered to the weighing hopper 28 and thereupon to interrupt operation of the conveyor 8 so that the hopper 28 can be emptied into a suitable bag or otherwise, and to cause the conveyor to resume operation when the empty hopper is returned to its receiving position.

The structure and the operation of a particular weighing and bagging machine 10 suitable for use in connection with the drive mechanism 6 of the invention have been described in detail in the copending application of W. C. Belk for Article Handling Apparatus, Serial No. 666,018, which application has been assigned to the assignee of the present application. It is to be understood, however, that the drive mechanism 6 of the invention is capable of use in connection with other conveyors.

A planetary gear assembly 40 (Figs. 1, 4, 5 and 6) of the conveyor drive mechanism 6 is located on a projecting end of the conveyor drive shaft 18. A drive motor 42 (Figs. 1 and 2) adjacent the conveyor frame 24 drives the planetary gear assembly 40 by means of a V-belt 44 trained around a sheave 46 of the motor 42 and around a gear case 48 within which the planetary gear assembly 40 is housed. Gearing 49 (Figs. 4 and 5) of the assembly 40 that is engaged with the drive shaft 18 is adapted to be controlled by means of a gear assembly control unit 50 (Figs. 1, 4, 5 and 6) in order to drive or stop the conveyor 16.

The gearing 49 comprises a first sun gear 52 (Figs. 4 and 5), which constitutes the control gear of the apparatus, and a second sun gear 54, which functions as the reaction gear. A sleeve-like hub 56 of the sun gear 52 mounts the gear 52 for free rotation on the projecting end of the conveyor drive shaft 18. A similar sleeve-like hub 58 of the gear 54 is fixed to the drive shaft 18 by a pin 60 for rotation wth the shaft. Peripheral grooves are provided interiorly of the hubs 56 and 58 at their adjacent ends, and an O-ring seal 62 (Fig. 5) is seated in each of these grooves. When the sun gears 52 and 54 are in operative position (Fig. 5) the O-ring seal 62 fits snugly against the shaft 18 to prevent the escape of lubricant from the gear case 48 along the shaft 18. While both of the sun gears 52 and 54 are of identical circular pitch, the first sun gear 52 has one tooth more than the second sun gear 54 and its pitch diameter is correspondingly greater than that of the second sun gear 54.

The gear case 48 comprises two similar covers 64 and 65 (Fig. 5) that are in the form of discs having mating flanges 66 and 68, respectively, at their peripheral edges. Adjacent the center of each cover 64 and 65 is a hub 70 in each of which is a suitable bushing 72. The bushings 72 rotatably mount the covers 64 and 65 on the hubs 56 and 58, respectively, of the sun gears 52 and 54. Outwardly of the bushings 72 the hubs 70 are provided with annular inturned flanges 74 that lie closely adjacent the hubs 56 and 58 of the sun gears 52 and 54. Between each annular flange 74 and the bushing 72 of the associated hub 70 is an annular groove 76. A plurality of radial passages 78 extend obliquely outward from each annular groove 76 to the interior of the gear case 48.

The two covers 64 and 65 of the gear case 48 are provided with continuous, outwardly projecting, peripheral fins 79 and 80, respectively, on the flanges 66 and 68. As best shown in Fig. 5, the peripheral fins 79 and 80 of the assembled covers of the gear case 48 have outwardly diverging frusto-conical surfaces on their adjacent faces that form a continuous V-groove 82 about the gear case 48. The previously mentioned V-belt 44 which connects the motor sheave 46 in driving relation with the planetary gear assembly 40 is disposed in the groove 82 of the gear case 48 and, therefore, the gear case 48 acts as a sheave or driving member to operate the gearing 49.

Planet gear assemblies 86 of the gearing 49 are rotatable in the gear case or driving member 48 in meshing relation with the sun gears 52 and 54 at diametrically opposite locations. The gears of the planet gear assemblies 86 are of the same circular pitch as the sun gears 52 and 54. Each planet gear assembly 86 comprises a first planet gear 88 (Fig. 5) having the same number of teeth as the first sun gear 52 but meshing with the second sun gear 54. A second planet gear 90 of each planet gear assembly 86, having the same number of teeth as the second sun gear 54, meshes with the first sun gear 52.

The individual gears 88 and 90 of each planet gear assembly are rigidly interconnected in coaxial relation by means of pins 92. Each gear assembly 86 is axially bored to receive a bushing 94 which forms a projecting shoulder at each end of the assembly. Opposite reduced diameter ends of shafts 96 upon which the planet assemblies 86 are journalled are suitably threaded and extend through aligned clearance holes in the gear case covers 64 and 65. Nuts 98, threaded on the ends of the shafts 96, draw the covers 64 and 65 into positive mating relation as well as into positive engagement with the radially enlarged center part of the shafts 96. The bushings 94 of the gear assemblies 86 position the planet gear assemblies 86 in spaced relation with respect to the interior surfaces of the covers 64 and 65 and mount the assemblies 86 for free rotation on the shafts 96.

Studs 100 (Fig. 4) similar to the shafts 96 carry nuts (not shown) which further aid in holding the covers 64 and 65 of the gear case 48 in fixed relation. The mating covers 64 and 65 form an internal groove therebetween when in assembled relation in which an O-ring seal 104 is disposed to close the gear case 48 against the passage of foreign material and lubricant between the assembled halves thereof.

The previously-mentioned gear assembly control unit 50 comprises a brake 105 that is associated with the end of the hub 56 of the sun gear 52, which projects therefrom through and beyond the left side of the gear case 48 (Fig. 5). The drum 106 (Fig. 5) of the brake 105 has a hub 108 secured as by a set screw 110 to the hub 56. A brake band 112, comprising an outer strap 114 of metal or other suitable material and an inner lining 116 of friction material, is arranged to make frictional engagement with the peripheral surface of the drum 106. Opposite ends of the brake band 112 have eyes 118 (Fig. 4) which are used in holding the band in position for engagement with the drum 106 as well as in drawing the band 112 into binding relation with the brake drum 106 to set the brake 105.

A brake actuator 120 (Figs. 1 and 4) of the gear assembly control unit 50 is mounted by means of a bracket 122 fixed on the side of the conveyor frame 24 and comprises a lever 124 which is fulcrumed at one end upon a stationary pivot pin 126 extending between laterally spaced legs 128 (Fig. 6) of the bracket 122. This end of the brake lever 124 is in the form of a yoke having side legs 130 through which the pivot pin 126 passes. The legs 130 are at opposite sides of the eye 118 at one end of the brake band 112, which eye is likewise anchored on the pin 126. The eye 118 at the other end of the brake band 112 is between downwardly projecting extensions 132 (Fig. 6) on the legs 130 of the brake lever 124 and is attached to the extensions 132 by a pin 134 which is spaced from the pivot pin 126.

The brake actuator 120 includes a solenoid 140 (Figs. 1, 4 and 6) that is secured to the bracket 122 adjacent the free end of the lever 124 and is provided with a reciprocable armature 142 that can be retracted a distance greater than the distance that the free end of the lever 124 must move to set the brake. At the outer end of the armature are two laterally spaced extensions 144 (Fig. 6) which are at opposite sides of a head 146 on the free end of the brake lever 124. The lever 124 and the armature 142 are resiliently interconnected by means of a tensile spring 148 of suitable strength. The spring is in the form of a loop and opposite ends of the spring 148 are anchored to the ends of a pin 150 (Fig. 6) carried by the armature 142 so that the looped spring fits about the brake lever head 146 in a shallow channel 152 (Fig. 4). The channel 152 retains the spring 148 in operative position on the head 146. Upon energization of the solenoid 140 the armature 142 is retracted and the brake lever 124 is pivoted about the pin 126 in the direction of the arrow 154 (Fig. 4). This causes the spring 148 to draw the pin 134 and the loop 118 thereon upward, tightening the brake band 112 and thereby immobilizing the brake drum 106 and the sun gear 52, which is rigid therewith as hereinbefore explained. The spring 148 provides a yieldable, and consequently self-adjusting connection between the brake lever 124 and the armature 142 of the solenoid 140 to compensate for wear of the friction lining 116 on the brake band 112.

In Fig. 3 it is shown that the electrical control system for the weighing and bagging machine 12 comprises three circuits 160, 162 and 164, respectively, that extend between electrical service leads 166 and 168. The circuit 160 includes a normally open hopper switch 172 (Figs. 1 and 3), a normally closed weight switch 174 (Figs. 2 and 3) and a relay R (Fig. 3) connected in series. The relay R includes a set of normally open contactors R1. Contactors R1 are in the circuit 162 and are in series with the brake actuating solenoid 140. The coils of the bagger drive motor 42 are in the circuit 164. A main control switch 176 is connected between the leads 166 and 168 and supply lines L1 and L2, respectively, of a source of suitable electrical energy (not shown).

The planetary gear assembly 40 functions in the following manner to transmit power from the motor 42 to the conveyor 16. When the weighing hopper 28 is empty but is in position to receive produce to be weighed, the hopper 28 is resiliently held in raised position and holds the hopper switch 172 closed. The normally closed weight switch 174 (Figs. 1 and 3) is likewise closed when the hopper 28 is in this position. When the main switch 176 (Fig. 3) is closed the motor 42 in the circuit 164 is energized and the closed hopper switch 172 and the closed weight switch 174 assure that the relay R will be immediately energized to thereupon close the contactors R1 in the circuit 162 and energize the brake solenoid 140. When such a condition exists, the brake 105 is set so that the brake drum 106 is held by the band 112 against rotation, thus immobilizing the first sun gear 52 although the driving member 48 is turned continuously in the direction of the arrow 180 (Fig. 4) by the motor 42. The planet gear assemblies 86 are carried by the rotating gear case 48 in a circular orbit about the sun gear 52. Due to the meshing engagement of the second planet gear 90 with the stationary first sun gear or control gear 52, the planet assemblies 86 are rotated about their axes as they are carried around by the driving member 48.

The difference in the pitch diameters of the first and second sun gears 52 and 54, respectively, prevents the first planet gears 88 of the assemblies 86 from rolling ineffectively on the second sun gear 54. Accordingly, the planet assemblies 86 drive the second sun gear 54, and since the latter is pinned to the conveyor shaft 18, it drives the conveyor shaft 18. The direction of rotation of the gear 54 and shaft 18 is indicated by the arrow 182. Hence, the conveyor shaft 18 rotates in the opposite direction to that of the gear case 48 and at a greatly reduced speed. Thus, the conveyor 8 is actuated to carry produce to be weighed and bagged from the receiving bin and to discharge them into the weighing hopper.

When the predetermined quantity of articles for which the weighing mechanism 34 is set has been delivered to the weighing hopper 28 by the conveyor 8, the hopper 28 is lowered against the resiliency provided by the weighing mechanism 34, the weight switch 174 is opened and the relay R is deenergized, thus opening the contactors R1. Therefore, the brake solenoid 140 is deenergized to release the brake 105. Upon release of the brake 105 the control gear 52 is free to rotate. The planet gear 88 thereupon rotates ineffectively about the gear 54 and no driving power is delivered to the conveyor drive shaft 18 from the driving member 48. The conveyor 8, therefore, stops and no more articles are delivered to the weighing hopper 28.

When the articles delivered to the weighing hopper 28 have been discharged in any suitable manner, the weight switch 174 is closed by the action of the weighing mechanism 34 as it returns the structure thereof by which the hopper 28 is supported to the upper position. During removal of articles from the weighing hopper 28, when the hopper, which preferably is pivotally secured to the weighing mechanism 34, is tilted out of the position shown in Fig. 1, the hopper switch 172 will open and remain open until the weighing hopper 28 is returned to its original position (Fig. 1) to close the switch 172. When both the hopper switch 172 and the weight switch 174 are again closed (Fig. 3) the relay R will be energized so that articles will again be delivered to the hopper 28.

During operation of the motor 42 the gear case 48 is continuously driven at relatively high speed and consequently some lubricant in the gear case 48 is apt to work its way along the hubs 56 and 58. Such lubricant will collect in the annular grooves 76 adjacent the outer ends of the hubs 70 from where it is thrown by centrifugal force through the radial passages 78 back into the gear case 48.

It will be understood from the preceding description that the conveyor drive mechanism 6 of the present invention provides a novel means for operating the conveyor 8 at a suitably slow speed as well as for smoothly starting and stopping the conveyor 8. Wear of the friction material 116 on the brake band 112 is compensated for by use of the spring 148 which acts as a self-adjusting connection between the solenoid armature 142 and the brake lever 124. Because of the smoothness of operation of the planetary gear assembly 40, the conveyor drive mechanism 6 accordingly can be depended upon to operate positively and accurately for a prolonged period of time.

It is to be understood that while a specific structure of the present invention has been illustrated in the drawings the invention is not to be limited thereby since various changes and modifications may be made in the details of the apparatus without departing from the principles of the invention and that the scope of the invention should be limited only by the scope and proper interpretation of the appended claims.

Having thus described the invention what is claimed as new and desired to be protected by Letters Patent is:

1. A drive mechanism for a conveyor having a drive shaft, comprising planetary gear means having a reaction gear coupled with said conveyor drive shaft, a freely rotatable control gear, a driving member, and means operatively interconnecting said driving member, said control gear, and said reaction gear to rotate said reaction gear upon immobilization of said control gear, means for rotating said driving member, a brake operably associated with said control gear and arranged when set to retain said control gear against rotation whereby said gear means is made effective to rotate said reaction gear and said drive shaft and thereby to move the conveyor, a brake actuating solenoid, and self-adjusting means interconnecting said solenoid and said brake to set said brake upon actuation of said solenoid.

2. In a conveyor drive mechanism having planetary gear means, a support structure, a brake operatively associated with said planetary gear means, said brake having a brake drum and a brake band, a lever pivotable on said support structure and connected adjacent a first end to said brake band, said lever being movable in a direction to draw said brake band into binding engagement with said brake drum, a brake actuator secured to said support structure adjacent the second end of said lever and having a member movable in said direction of movement of the lever, and a coil spring looped about said lever having both ends connected to said brake actuator member so that brake wear and movement of said actuator member in excess of that needed to set said brake may be compensated.

3. A drive mechanism for a conveyor having a drive shaft, comprising a support structure, planetary gear means having a reaction gear coupled with said conveyor drive shaft, a freely rotatable control gear, a driving member, and means operatively interconnecting said driving member, said control gear, and said reaction gear to rotate said reaction gear upon immobilization of said control gear, means for rotating said driving member, a brake having a drum connected to said control gear, a brake band movable into binding relation with said brake band to set said brake, a lever pivotable on said support structure and connected adjacent a first end to said brake band, said lever being movable in a direction to move said brake into binding relation with said brake drum, a brake actuator secured to said support structure adjacent the second end of said lever and having a member movable a distance in the direction of and in excess of the movement required of the lever to set the brake, and resilient means connecting said lever and said brake actuator member whereby said gear means is made effective to rotate said reaction gear upon operation of said brake actuator to set said brake and thereby to retain said control gear against rotation so that said reaction gear is driven by said driving member to turn said shaft and move the conveyor.

4. A drive mechanism for a conveyor having a drive shaft, comprising a support structure, planetary gear means having a reaction gear coupled with said conveyor drive shaft, and a freely rotatable control gear, a driving member, and means operatively interconnecting said driving member, said control gear and said reaction gear to rotate said reaction gear upon immobilization of said control gear, means for rotating said driving member, a brake having a drum connected to said control gear, a brake band movable into binding relation with said brake band to set said brake, a lever pivotable on said support structure and connected adjacent a first end to said brake band, said lever being movable in a direction to move said brake band into binding relation with said brake drum, a solenoid secured to said support structure adjacent the second end of said lever and having an armature movable in said direction of movement of the lever, and resilient means connecting said lever and said solenoid armature whereby said brake is set upon actuation of said solenoid to immobilize said control gear so that said reaction gear is driven by said driving member to turn said drive shaft and move the conveyor.

5. In a conveyor drive mechanism, a support structure, a material delivery conveyor having a drive shaft journalled in said support structure, planetary gear means having a reaction gear coupled with said conveyor drive shaft, a freely rotatable control gear, a driving member, and means operatively interconnecting said driving member, said control gear, and said reaction gear upon immobilization of said control gear, means for rotating said driving member, a hopper secured to said support structure adjacent said conveyor and arranged to receive material delivered by said conveyor, said hopper being resiliently retained in material receiving position when empty, a brake operably associated with said control gear and arranged when set to immobilize said control gear whereby said reaction gear is driven upon rotation of said driving member so as to turn said drive shaft and move said conveyor for the delivery of material to said hopper, a brake actuating solenoid secured to said support structure, self-adjusting means interconnecting said brake actuating solenoid and said brake, an electrical control circuit for said solenoid, and switch means on said support structure operably connected in said electrical control circuit of said brake actuating solenoid, said switch means being closed when said hopper is in receiving position to energize said solenoid.

6. A drive mechanism for a conveyor comprising a support structure, a drive shaft mounted for moving said conveyor, drive means mounted on said drive shaft, a brake having a drum connected to said drive means, a brake band movable into binding relation with said brake band to set said brake, a lever pivotable on said support structure and connected adjacent a first end to said brake band, said lever being movable in a direction to move said brake band into binding relation with said brake drum, a solenoid secured to said support structure adjacent the second end of said lever and having an armature movable in said direction of movement of the lever, and resilient means connecting said lever and said solenoid armature whereby said brake is set upon actuation of said solenoid so that said drive means rotate said drive shaft and move the conveyor.

References Cited in the file of this patent
UNITED STATES PATENTS

| 715,058 | Haber | Dec. 2, 1902 |
| 2,357,212 | Magee | Aug. 29, 1944 |
| 2,381,505 | Lindholn | Aug. 7, 1945 |
| 2,474,990 | Slatin | July 5, 1949 |
| 2,533,056 | Selby | Dec. 5, 1950 |

FOREIGN PATENTS

| 344,064 | Italy | Oct. 22, 1936 |